United States Patent [19]

Saccoccia et al.

[11] Patent Number: 5,651,515
[45] Date of Patent: Jul. 29, 1997

[54] METHOD FOR RE-ORBITING A DUAL-MODE PROPULSION GEOSTATIONARY SPACECRAFT

[75] Inventors: Giorgio Saccoccia, Lisse, Netherlands; Fabrizio Paganucci, Grosseto; Fabrizio Scortecci, Rapolano Terme, both of Italy

[73] Assignee: Agence Spatiale Europeenne, Paris Cedex, France

[21] Appl. No.: 380,406

[22] Filed: Jan. 30, 1995

[51] Int. Cl.$^6$ .................................................. B64G 1/26
[52] U.S. Cl. ........................ 244/158 R; 244/164; 244/172
[58] Field of Search ............................ 244/158 R, 164, 244/169, 172, 176, 73; 60/202, 203.1, 259, 225, 250

[56] References Cited

U.S. PATENT DOCUMENTS

| | | | |
|---|---|---|---|
| 3,097,480 | 7/1963 | John | 244/172 |
| 4,635,885 | 1/1987 | Hujsak | 244/169 |
| 5,251,852 | 10/1993 | Pulkowski et al. . | |
| 5,263,666 | 11/1993 | Hubert et al. | 244/169 |
| 5,283,357 | 2/1994 | Sackheim . | |
| 5,395,076 | 3/1995 | Lichtin et al. . | |

*Primary Examiner*—Andres Kashnikow
*Assistant Examiner*—Tien Dinh
*Attorney, Agent, or Firm*—Sughrue, Mion, Zinn, Macpeak & Seas

[57] ABSTRACT

At the end of the operative life of the spacecraft, when all the propellant has been consumed for the normal attitude and orbit control operations, the arcjet thrusters are connected to a feed line for being fed with the helium still remaining in the pressurant tank and the arcjet thrusters are then fired to perform the complete re-orbiting maneuver until the spacecraft is placed in a graveyard orbit.

2 Claims, 4 Drawing Sheets

DUAL-MODE PROPULSION SYSTEM WITH ARCJET RE-ORBIT SYSTEM

DUAL-MODE PROPULSION SYSTEM WITH ARCJET RE-ORBIT SYSTEM

BI-PROPELLANT PROPULSION SYSTEM WITH ARCJET RE-ORBIT SYSTEM

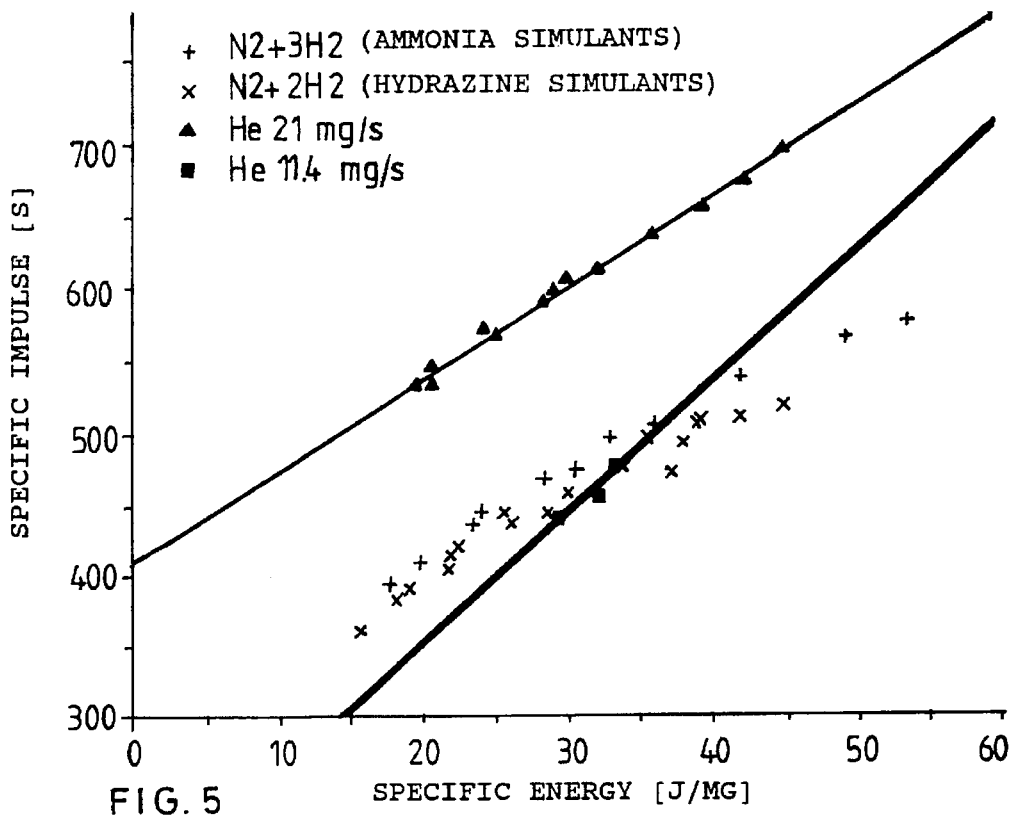
FIG. 5 SPECIFIC IMPULSE VS. SPECIFIC ENERGY FOR DIFFERENT PROPELLANTS
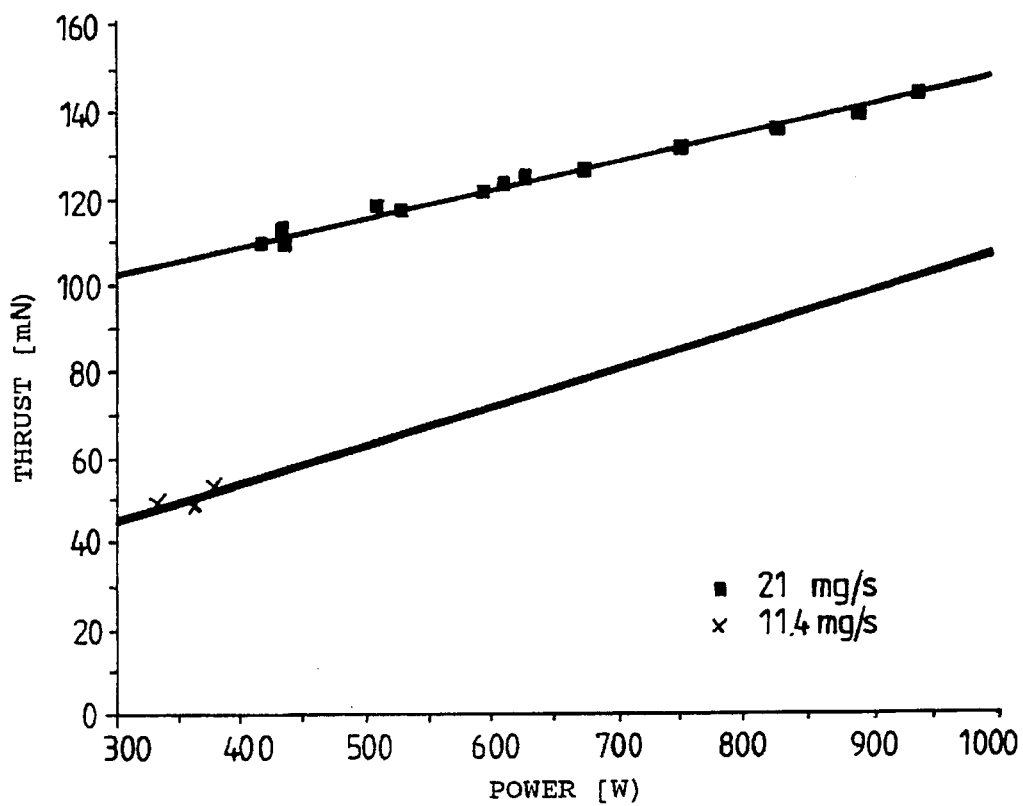
FIG. 6 THRUST VS. POWER FOR HELIUM PROPELLANT

METHOD FOR RE-ORBITING A DUAL-MODE PROPULSION GEOSTATIONARY SPACECRAFT

FIELD OF THE INVENTION

The present invention relates to systems for re-orbiting a geostationary spacecraft at the end of its life.

BACKGROUND OF THE INVENTION

In order to reduce as much as possible the release of debris into geostationary orbit and make available slots in such a busy orbit for new satellites, it is recommended that a geostationary satellite at the end of its life, before complete exhaustion of its propellant, should be transferred to a supersynchronous graveyard orbit that does not intersect the geostationary orbit.

The effectiveness of such a re-orbiting maneuver depends totally on the precision in the calculation of the propellant residual which will be used for the maneuver. An under evaluation of the residual will make the successful completion of the maneuver not possible and an overestimation will cause a reduction in the operative time for the spacecraft, with a consequent loss of money for a commercial spacecraft.

DESCRIPTION OF THE PRIOR ART

Arcjet propulsion systems are well developed electric propulsion devices which are being used from now on for the North-South Station Keeping (NSSK) of geostationary satellites (Telstar IV, Intelsat VIII, etc.) and other applications. The advantage of using a low-power arcjet (1 to 2 kW) instead of a conventional chemical propulsion system lies in the higher specific impulse of an arcjet system, which allows a considerable reduction in the weight of the propellant to be brought on board. At the same time, arcjets provide higher thrusts than other electric propulsion devices, thereby reducing the firing time. For these reasons a complete low-power arcjet system has already been qualified for space application by Rocket Research (USA), and development activities are being carried out in Europe (BPD and Centrospazio in Italy, DASA and IRS in Germany), and in Japan.

Another advantage of an arcjet thruster is that it can make use of many different types of propellant. The specific impulse is strictly dependent on the propellant chosen.

Hydrazine is used for arcjets on geostationary satellites, because hydrazine arcjets can be part of a very effective propulsion system (called "Dual Mode") using pure hydrazine for all the thrusters present on board the spacecraft (apogee booster motor, NSSK arcjets, attitude control monopropellant thrusters). In such a way, the total weight of the spacecraft propulsion system can be optimized.

Arcjets using liquid hydrazine need a decomposer device (called gas generator) in order to create the gas which supplies the thruster.

The specific impulse of a 2 kW class hydrazine arcjet is in the order of 530 s.

SUMMARY OF THE INVENTION

The present invention provides a solution to this problem by allowing a well determined quantity of propellant to be used for the re-orbiting maneuver.

The object of this invention is to provide a method of re-orbiting of a dual-mode propulsion geostationary spacecraft comprising propellant thrusters and arcjet thrusters.

At the end of the operative life of the spacecraft, when all the propellant has been consumed for the normal attitude and orbit control operations, the arcjet thrusters are connected to a feed line for being fed with the helium still remaining in the pressurant tank and the arcjet thrusters are then fired to perform the complete re-orbiting maneuver until the spacecraft is placed in a graveyard orbit.

In addition, when the operative life of the spacecraft is completed, all the electrical power can be switched to feed the arcjet in operation.

BRIEF DESCRIPTION OF THE DRAWINGS

FIG. 5 is a diagram showing the specific impulse vs. specific energy for different propellants.

FIG. 6 is a diagram showing the thrust vs. power for helium propellant.

DESCRIPTION OF THE INVENTION

Figure 1:
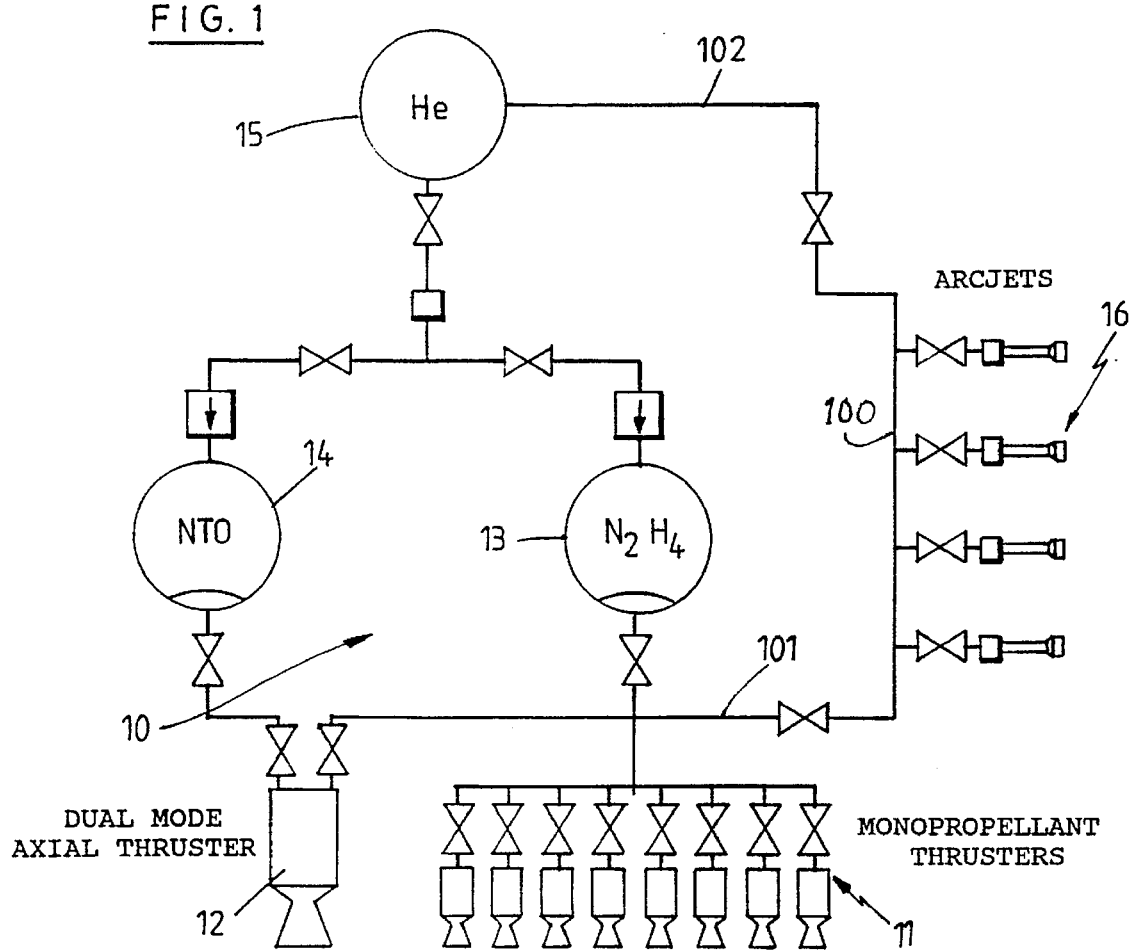
FIG. 1 schematically shows a dual-mode propulsion system with an arcjet re-orbit system.

FIG. 1 schematically shows a dual-mode propulsion system 10 which includes low-power arcjets provided on board for the normal attitude and orbit control of the spacecraft. The system comprises monopropellant thrusters 11, dual mode axial thrusters 12, propellant tanks 13 and 14, a helium pressurant tank 15 and arcjets 16. At the end of the operative life of the spacecraft this invention provides switching the arcjet feeding line 100 from the hydrazine line 101 to the helium line 102 coming from the pressurant tank 15. Since gaseous helium is already present at the entrance of the arcjet, the existing gas generator will not work in this phase of the arcjet operation. Only a few hours of firing will be added to the already qualified arcjet life for the re-orbiting maneuver.

Figure 2:
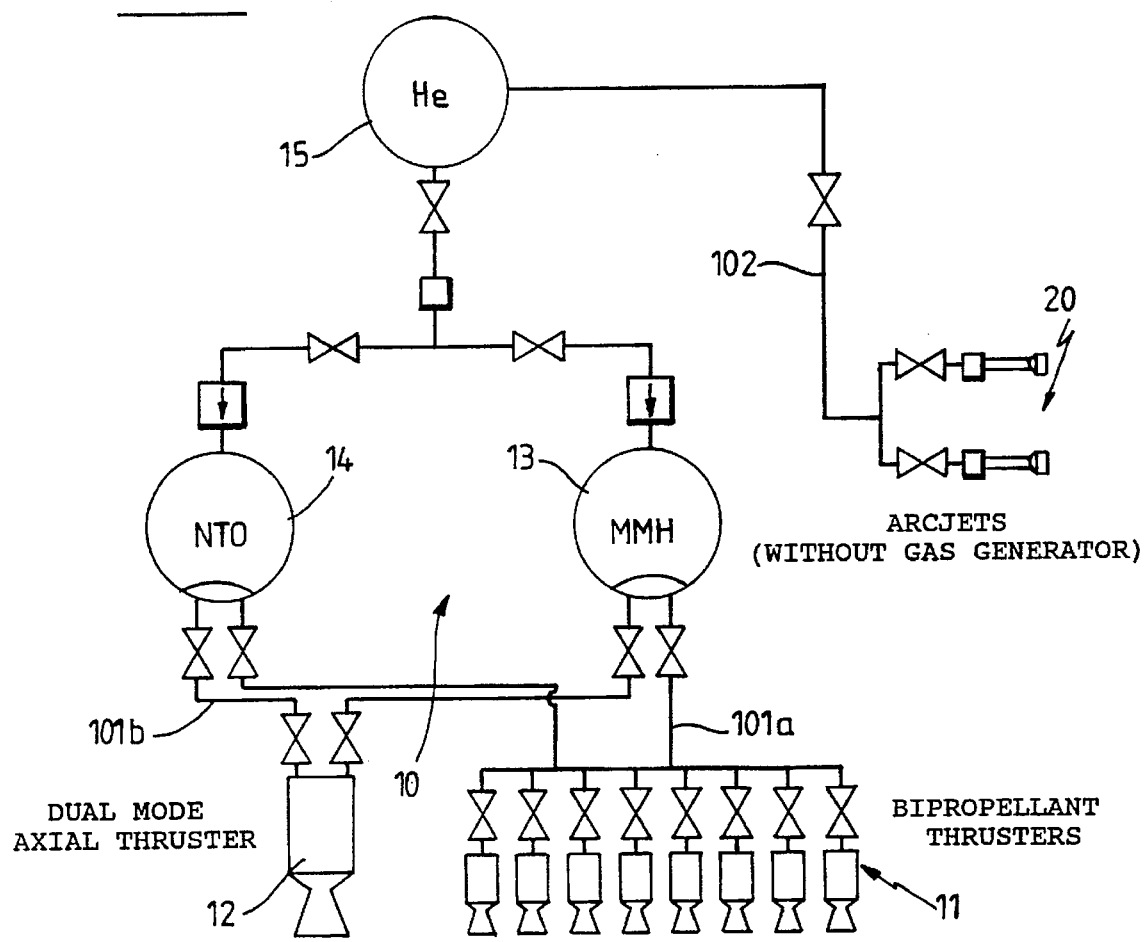
FIG. 2 schematically shows a bi-propellant propulsion system with an arcjet re-orbit system.

When the spacecraft propulsion system does not include any arcjet for its normal attitude and orbit control (AOC) operation, a dedicated arcjet system 20 (without gas generator) should be added to the spacecraft propulsion system 10 (FIG. 2) and connected only to the pressurant tank 15. The arcjet system will be used only for the re-orbiting maneuver.

The main advantages of the re-orbiting method of this invention with respect to the currently adopted method are the following:

(a) The re-orbiting maneuver being based on the availability of a propellant different from the one used for the normal operation of the spacecraft, there is no uncertainty as to the availability of the propellant (Helium) at the end of the operative life of the satellite. Accordingly, the re-orbiting maneuver will be performed safely and there will be no waste of propellant (longer operations until the total consumption of the available propellant);

(b) A substantial saving in the overall weight of the spacecraft is to be expected;

(c) Such a re-orbiting maneuver is very effective, because it makes use of the maximum of electrical power available on board (otherwise useless at the end of the operative life of the spacecraft) and of the residual propellant which would have no other use in the satellite operation;

(d) As recommended, the propellant and pressurant tanks will be empty at the end of the maneuver, thereby avoiding possibilities of explosions.

Calculations have been done in order to illustrate the feasibility of the proposed method assuming a spacecraft having a 1000 kg end of life (EOL) weight.

No specific requirements have been fixed so far for the orbit removal of a geostationary satellite. However, the following recommendations (CCIR Study Groups, "Draft New Recommendation: Environmental Protection of the Geostationary Orbit", Document 4A/TEMP/92(Rev.2)-E, 29 May 1992, Annex 1) have been adopted:

a) The perigee altitude should be increased by 300 km or more and the apogee by a comparable amount;

b) In order to preclude possibilities of explosions, any residual propellants and pressurants have to be vented or consumed.

The cost to reboost a satellite into a graveyard orbit is 3.64 m/s/100 km. On the basis of the recommended increase of 300 km in the perigee orbit, the Δv required will be about 11 m/s.

A first good approximation of the propellant needed to perform the re-orbiting maneuver is given by:

$$M_2 = M_{dry} \left[ \frac{1 - e^{-\frac{\Delta v}{v_e}}}{e^{-\frac{\Delta v}{v_e}}} \right] \quad (1)$$

where:

$M_p$=mass of propellant needed to perform the maneuver
$M_{dry}$=mass of the satellite EOL
$\Delta v$=velocity variation required by the maneuver
$v_e$=exhaust velocity of the propellant from the thruster
=$I_{sp} \cdot g_0$
$I_{sp}$=specific impulse of the thruster
$g_0$=acceleration of gravity (sea level).

The time of firing of the thruster will be given by:

$$t = \frac{M_p v_e}{T} \quad (2)$$

where:

t=time necessary to burn the quantity $M_p$ of propellant
T=engine thrust.

For an arcjet, the available thrust will be given by:

$$T = \frac{2 P_{thrust}}{I_{sp} g_0} \quad (3)$$

where:

$$P_{thrust} = P_{available} \pi_{PCU} \pi_{thrust} \quad (4)$$

and:

$P_{thrust}$=electrical power which is directly transformed in thrust
$P_{available}$=electrical power delivered by the satellite power subsystem
$\pi_{PCU}$=efficiency of the power conditioning unit
$\pi_{thrust}$=thrust efficiency.

For a Chemical monopropellant thruster:

$I_{sp}$(reference)=220s→$v_e$=2156 m/s T:0.5N

Equations (1) and (2) give:

$M_p$=5.11 kg
t=6 h 7 m.

For a Low-power arcjet:

$I_{sp}$ (reference with Helium)=700s→$v_e$ =6860 m/s

Equation for the (1) gives:

$M_p$=1.60 kg.

For an arcjet like the one qualified by Rocket Research, and assuming an availability of power of about 2 kW, the following reference values can be used:

$\pi_{PCU}$=0.9
$\pi_{thrust}$=0.35

Equations (3) and (4) give:

T=0.182N.
$P_{thrust}$=630 W

Finally, equation (2) gives, the time of firing:

t=16 h 45 m.

As will be apparent from the foregoing, using a low-power arcjet for the re-orbiting maneuver allows a propellant mass saving of about 70% (possibly higher if more electrical power is available at EOL).

It should be mentioned that when a re-orbiting maneuver is performed using a chemical monopropellant thruster, the uncertainty in the methods currently used to measure the propellant residual in the tanks results in the propellant left after operational purposes being probably much more than the weight indicated above.

However, the re-orbiting method described here has certain limitations, which can be summarized as follows:

1) The helium left in the pressurant tank of a typical telecommunication satellite at EOL is usually less than the quantity shown above as being needed to perform the complete 300 km re-orbiting maneuver (about the 25%).

2) Such a remaining pressurant can be used only partially, because the arcjet works in blow-down mode and there is a minimum of mass flow rate which makes the correct operation of the arcjet possible (the quantity of pressurant which can be used may be evaluated to about 70% of the total pressurant left in the tank).

3) While the increase in weight necessary for the adoption of the proposed re-orbiting concept is almost negligible in the case of a satellite already using arcjets for the NSSK, in the case of an additional arcjet and PCU, the increase in weight can be about 3.5 kg.

The first two problems can be solved by taking into account a larger quantity of pressurant in the tank at the time of the spacecraft design definition and also choosing a bigger tank, if necessary.

The re-orbiting maneuver can also be performed using the pressurant contained in the propellant tanks at the EOL, but this may create additional design problems, however.

It is emphasized again that the method of this invention provides a reliable and safe re-orbiting maneuver at the very end of the operative life of a spacecraft.

Figure 3:
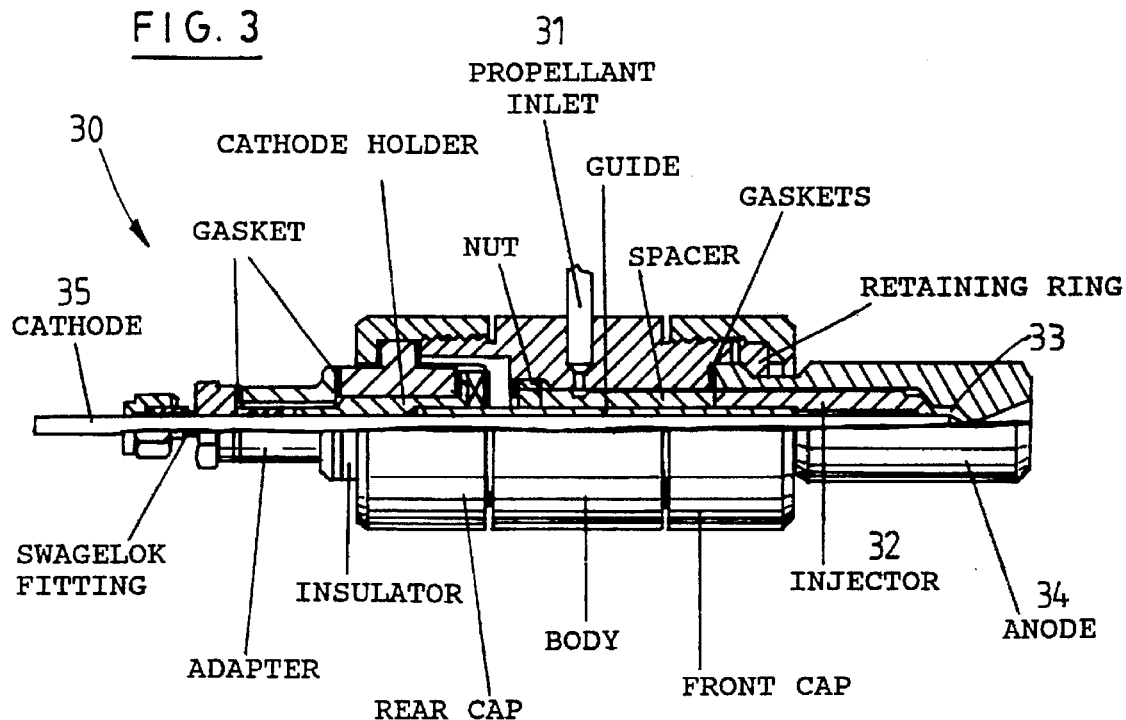
FIG. 3 is an axial sectional view of an exemplary low-power arcjet thruster developed in order to verify the performance of the invention.

In order to verify the performance of an arcjet working with helium at end of life EOL, an exemplary low-power arcjet thruster suitable has been designed for use to advantage in the system of the invention. The body has been designed in such a way as to permit simple interchange of critical parts and cathode positioning, while the design of the radiation-cooled nozzle was already oriented towards a possible flight configuration. The overall configuration is shown in FIG. 3.

Figure 4:
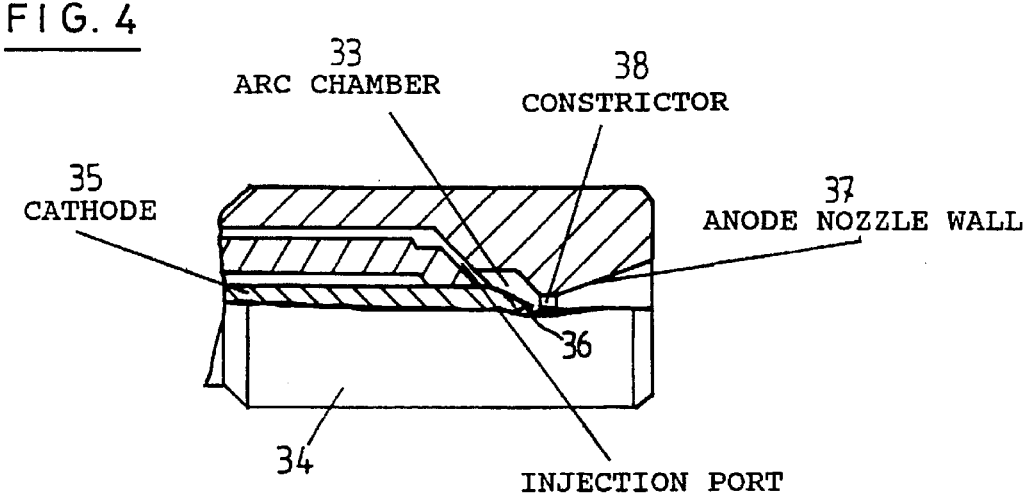
FIG. 4 is an enlarged view of a portion of FIG. 3.

The gas mixture flows through a stainless steel feeding tube 31 into a boron nitride injector 32 and is finally fed through tangential ports into an arc chamber 33 provided within an anode piece 34, so as to establish a vortex flow field around a cathode 35. FIG. 4 shows the anode piece on a larger scale. In operation, an arc occurs between the cathode tip 36 and the anode nozzle wall 37 through a constrictor 38. The thruster body and other structural elements are made of TZM molybdenum alloy. Both the cathode 34 and the anode 35 are made of 2% thoriated tungsten.

The anode piece features a thermal dam, in the form of a striction zone designed to limit conduction between the hot end of the anode 35 and the rest of the thruster. The external surface of the anode is plasma-spray coated with a 0.25 mm thick layer of zirconium diboride (Z-B2). This coating is intended to increase the radiative heat dissipation of the anode via a higher thermal emissivity of the surface, while retaining the dimension of the anode piece (22 mm) within the limits adopted in the design phase. The thruster length is about 190 mm and the diameter of the body is 40 mm. The conical nozzle is 9.75 mm long and the output diameter is 8 mm. The cathode has a conical tip of 60° aperture and was obtained by grinding the conical tip onto a commercial electrode intended for TIG welding.

Other thruster's characteristic dimensions are shown in the following table:

| | |
|---|---|
| Constrictor ø (mm) | 0.5 |
| Constrictor length (mm) | 0.25 |
| Nozzle exit ø (mm) | 5.3 |
| Exit area ratio | 113 |
| Nozzle type | 20° cone |
| Cathode ø (mm) | 3.0 |
| Cathode tip angle | 60° |
| Cathode tip | sharped |
| Cathode gap setting (mm) | 0.5 |
| Propellant injection angle | 53° |
| Number of injection ports | 6 |
| Plenum chamber ø (mm) | 6.0 |
| Plenum chamber angle | 45° |

Tests have been carried out to investigate the performance of a small/medium satellite system using arcjets, as compared with other propulsion systems in terms of possibility of working with different types of propellant and the good performance in terms of specific impulse, thrust and efficiency still available at very low power levels.

FIG. 5 shows the performance of the thruster expressed as Specific Impulse vs. Specific Energy (the ratio between power and mass flow rate), measured for different types of propellant as simulated hydrazine, simulated ammonia and helium. The tests have been performed for different mass flow rates for each propellant and it is interesting to note how this parameter has a low influence on the characteristics of the curves at high values (above 25 mg/s). On the contrary, for helium (mass flow rates lower than 25 mg/s, representative of a possible situation at the satellite EOL, with thrusters working in blow-down mode), the curves vary strongly depending on the variations of this parameter. This behavior is likely to be due to the pressure in the nozzle, which strongly affects the frozen flow efficiency and, as a consequence, the propulsive performance. It is worth of noting the flexibility of the arcjet tested, which has demonstrated its capability to operate at a very low mass flow rate, although with not so high a performance. This characteristic may prove useful when the thruster is used at the boundaries of its operational field (i.e. at the end of life of a propulsion system working in blow-down mode).

The thrust performance for the arcjet working with helium is shown in FIG. 6, as a function of the power available. Tests have been performed up to a minimum power level of 330 W for helium.

In both figures, a linear extrapolation has been added to the experimental values, in order to show the performance trend at power level higher than 1 kW, available at the satellite EOL, when all the other instruments consuming electrical power have been switched off.

In conclusion, the reference numbers used to perform the calculations for the Re-orbit Dedicated Arcjet System are confirmed by the experimental results gathered on a laboratory model arcjet system.

In addition to some system advantages like the availability of more helium tanks on board of future telecommunication satellites (i.e. the Marin Marietta Intelsat VIII), the results show the feasibility of the invention, in particular for satellites already making use of arcjets as part of a complete Dual Mode system.

We claim:

1. A method of re-orbiting a dual-mode propulsion geostationary spacecraft at end of life, said spacecraft comprising dual mode and mono propellant thrusters, and arcjet thrusters, at least one propellant tank and a helium pressurant tank, the method comprising the steps of:

(a) at the end of life of the spacecraft and subsequent to depletion of the propellant tank, connecting the arcjet thrusters to a feed line and feeding them only with the helium left in the pressurant tank; and (b) firing said arcjet thrusters until the spacecraft is placed in a graveyard orbit.

2. The method as claimed in claim 1, wherein said feed line is connected directly between said arcjet thrusters and said pressurant tank, and wherein there is another feed line connected between said arcjet thrusters and said propellant tank.

* * * * *